United States Patent
Boillat et al.

[11] Patent Number: 5,934,644
[45] Date of Patent: Aug. 10, 1999

[54] SETTING DEVICE FOR A VENTILATION FLAP

[75] Inventors: Pierre Boillat, Murten; Ralf Martin, Benningen; Urs Portmann, Villars-Sur Glane, all of Switzerland; Christian Richter; Rudolf Scholz, both of Dresden, Germany; Leopold Seczer, Erdmannshausen, Germany

[73] Assignee: Saia AG Industrie-Elektronik Und Komponenten Behr GmbH & Co, Stuttgart, Germany

[21] Appl. No.: 08/652,472

[22] PCT Filed: Dec. 12, 1994

[86] PCT No.: PCT/EP94/04120

§ 371 Date: Jun. 18, 1996

§ 102(e) Date: Jun. 18, 1996

[87] PCT Pub. No.: WO95/16582

PCT Pub. Date: Jun. 22, 1995

[30] Foreign Application Priority Data

Dec. 18, 1993 [DE] Germany .............. 43 43 385

[51] Int. Cl.[6] ........................................ B60H 1/24
[52] U.S. Cl. ........................................ 251/129.11
[58] Field of Search ............... 251/129.11, 129.12, 251/129.13

[56] References Cited

U.S. PATENT DOCUMENTS

| 4,154,425 | 5/1979 | Smith | 251/129.11 |
| 4,915,074 | 4/1990 | Arai | 251/129.11 |
| 4,951,712 | 8/1990 | Becker | 251/129.11 |
| 5,100,101 | 3/1992 | Shah | 251/129.11 |
| 5,113,824 | 5/1992 | Haubner | 251/129.11 |
| 5,160,115 | 11/1992 | Ito et al. | 251/129.11 |
| 5,398,910 | 3/1995 | Kitazawa | 251/129.11 |

Primary Examiner—Marguerite McMahon
Attorney, Agent, or Firm—Foley & Lardner

[57] ABSTRACT

The invention relates to a setting device for a ventilation flap (12, 12a, 12b) in an air duct, particularly in a heating and ventilation system of an automobile, with an electric motor (2) executing setting movements and with a control unit (3) for the electric motor (2). In order to minimize the outlay in terms of assembly and the replacement parts to be kept available, there is provision for designing the electric motor (2) as a stepping motor activated by output signals from a control unit (3) adjacent to this stepping motor, and the control unit (3) has encoding inputs (K1, K2) for selecting the direction of rotation and/or the rotary angle.

10 Claims, 5 Drawing Sheets

SETTING DEVICE FOR A VENTILATION FLAP

BACKGROUND OF THE INVENTION

The invention relates to a setting device for a ventilation flap in an air duct, particularly in a heating and ventilation system of an automobile.

Ventilation flaps are used in the air ducts of heating and ventilation systems or air conditioning systems in an automobile and are usually adjusted via Bowden pull mechanisms or mechanical transmissions.

It is known to adjust the ventilation flaps by an electric motor, a corresponding control unit for the electric motor being arranged in the region of the dashboard. Desired-value transmitters to be adjusted by the user are provided for the rotary angles of the flap in the control unit, the associated electric motor being adjusted according to the desired-value presetting via the electronics.

A plurality of ventilation flaps are arranged in an automobile, and these, as a rule, have different directions of rotation and often also have to be adjusted over different rotary angle ranges. Each electric motor must therefore be actuated in an appropriate way by the control unit.

In the mounting of a plurality of ventilation flaps adjustable in each case by means of electric motors, it is necessary to ensure that the respective control outputs are correctly assigned to the respective electric motors. Although confusion between the junction leads can be recognized during an operating test, there is nevertheless the risk of damage to the ventilation flap or to the electric motor when, for example on account of incorrect assignment, the electric motor is adjusted beyond a permissible rotary angle range.

SUMMARY OF THE INVENTION

The object on which the invention is based is to develop a generic setting device in such a way that, along with easier mounting and high operating reliability, electromechanical adjustment of a ventilation flap is achieved.

The object is achieved, according to the invention, defined herein.

The electric motor designed as a stepping motor is activated by the output pulses from the control unit, each electric motor having adjacent to it a control unit which possesses encoding inputs for the selection of the direction of rotation and/or of the rotary angle. The stepping motor and the control unit are arranged in the region of the ventilation flap, so that the control unit simply has to be connected to a transmitter arranged in the dashboard of the automobile. The stepping motor physically connected to the control unit is designed in the same way, irrespective of its place of use; adaptation to its place of use, that is to say the direction of rotation predetermined for the place of use as well as the rotary angle, is achieved by the occupancy of the encoding inputs. In a heating and ventilation system or air conditioning system, therefore, the same structural units composed of stepping motor and of control unit are always used, so that both an interchange of the motors and a simple replacement of a motor are possible. The input signals predetermining a desired value are fed in analog form to the control unit and are converted by the latter into output pulses which are used in a known way for controlling the stepping motor. These preferably digital pulses bring about the adjustment of the electric motor and consequently a corresponding adjustment of the ventilation flap in individual steps of predeterminable rotary angle.

In a preferred embodiment, the stepping motor and the control unit assigned to it are arranged in a common housing. The control unit is preferably arranged in the housing of the stepping motor.

The junctions of the control unit, that is to say the voltage supply, the desired-value junctions and the encoding junctions, are preferably designed as plug junctions which are, in particular, located behind a housing window of the common housing. A preferably one-part plug can be attached to the plug junctions, which plug is to be introduced in the correct position into the window, for example by means of notches, projections or the like, and, by being plugged on, predetermines the voltage supply, the junctions to the desired-value transmitter and the encoding of the control unit or of the stepping motor. A service technician entrusted with repair or maintenance can mount an exchange motor available to him at any point in the heating and ventilation system, the stepping motor being driven in its direction of rotation and its possible rotary angle via the encoding inputs by plugging the plug onto the plug junctions.

BRIEF DESCRIPTION OF THE INVENTION

Further features of the invention emerge from the further claims, the description and the drawing, in which an exemplary embodiment of the invention is represented, said exemplary embodiment being described in detail below. In the drawing:

FIG. 1 shows a diagrammatic representation of a setting device according to the invention for a ventilation flap, FIGS. 2 to 5 show setting devices according to FIG. 1 with a different connection of the encoding inputs, FIG. 6 shows a view of a structural unit of the setting device according to the invention from the junction side, FIG. 7 shows a section along the line VII—VII in FIG. 6, FIG. 8 shows a top view of a setting device according to the invention.

DETAILED DESCRIPTION OF THE PREFERRED EMBODIMENTS

Figure 1:
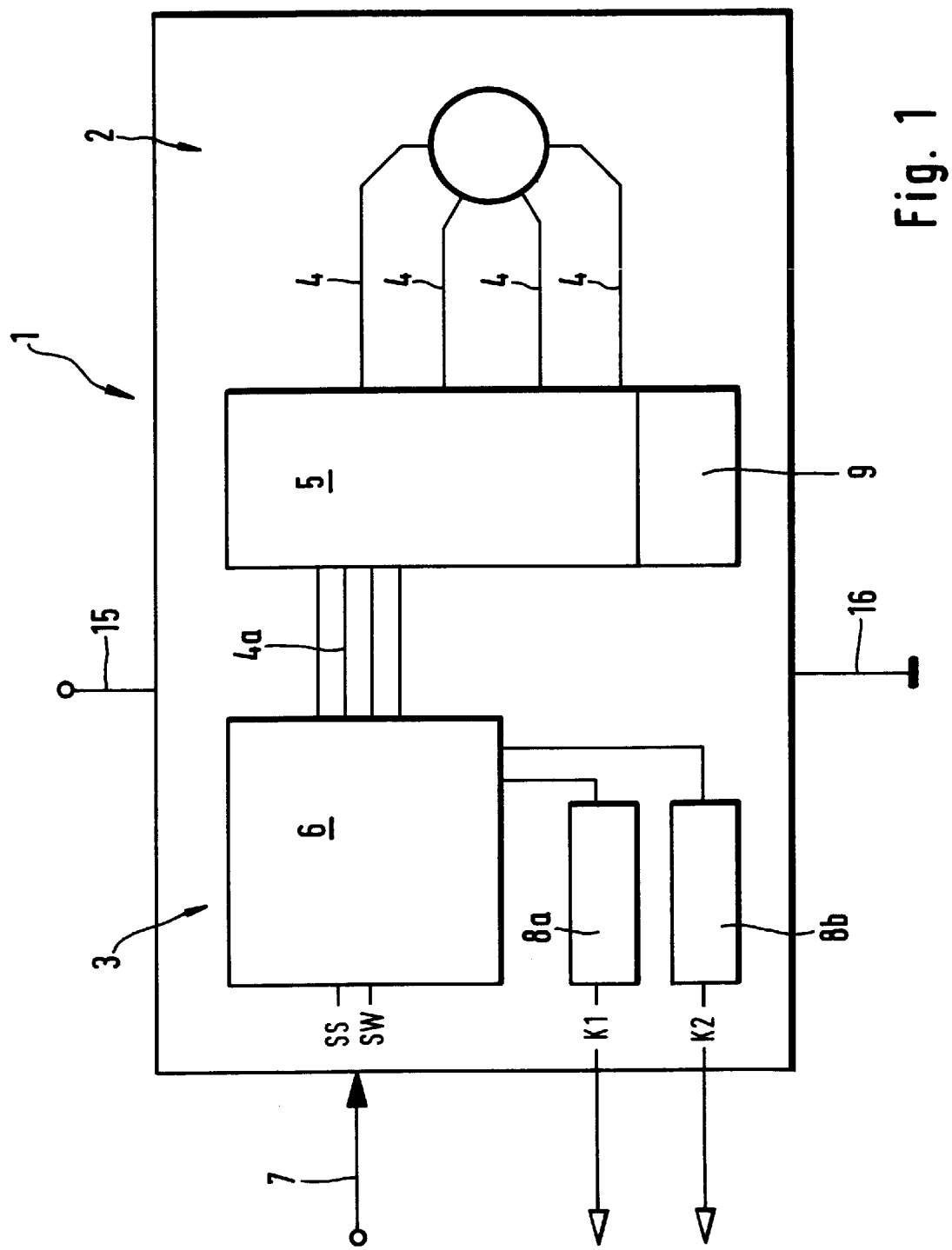

The setting device 1 represented diagrammatically in FIG. 1 consists of a control unit 3 and of an electric motor 2 which, in the exemplary embodiment, is designed as a stepping motor. The stepping motor 2 is activated via control leads 4 by a power stage 5 which is controlled by a control circuit 6. A desired-value signal for the rotary angle position of the stepping motor 2 is applied to the control circuit 6 via an input lead 7. The direction of rotation and permissible rotary angle range are communicated to the control circuit 6 via encoding stages 8a, 8b. The encoding stages 8a, 8b are connected via encoding inputs K1, K2. The necessary supply voltage is applied to the control unit 3 via the junction terminals 15 and 16; the stepping motor 2 is supplied with electrical energy via the control unit 3.

The analog input signal sent to the control unit 3 or control circuit 6 via the input lead 7 represents the desired rotary angle position of the stepping motor 2. This input signal is converted by the control circuit 6 into output pulses or digital output signals and is evaluated via connecting leads 4a and the power stage 5, via control leads 4, in order to operate the electric motor 2. The digital output signals from the control circuit 6 take into account the values for the direction of rotation and the maximum rotary angle, that is to say the permissible adjustment range of the ventilation flap, which are imparted via the encoding inputs K1 and K2.

The control unit 2 is provided, furthermore, with an electronic self-diagnosis circuit 9, the function of which is described particularly in European Patent Application 93810805.7 of the Applicant SAIA.

FIGS. 2 to 5 show examples of connections of the setting device according to the invention. The input lead 7 is formed by a voltage divider 10, the center tap 7b of which is applied to the terminal SW, whilst the terminal SS is grounded (terminal 16) via the variable resistor 11.

The encoding inputs K1 and K2 are open, with the result that the electric motor has a direction of rotation, by means of which the ventilation flap 12 can be adjusted clockwise out of its position of rest in the direction of the arrow 13. The adjustment angle in the clockwise direction (arrow 13) possible out of the position of rest shown is, for example, 70°.

Figure 2:
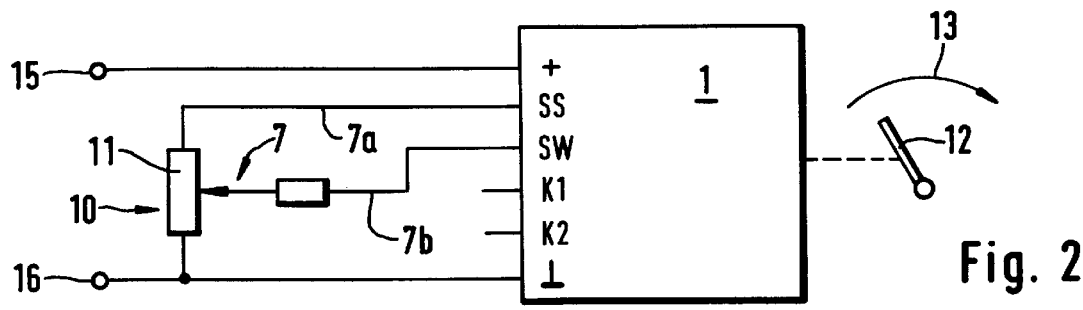
Figure 3:
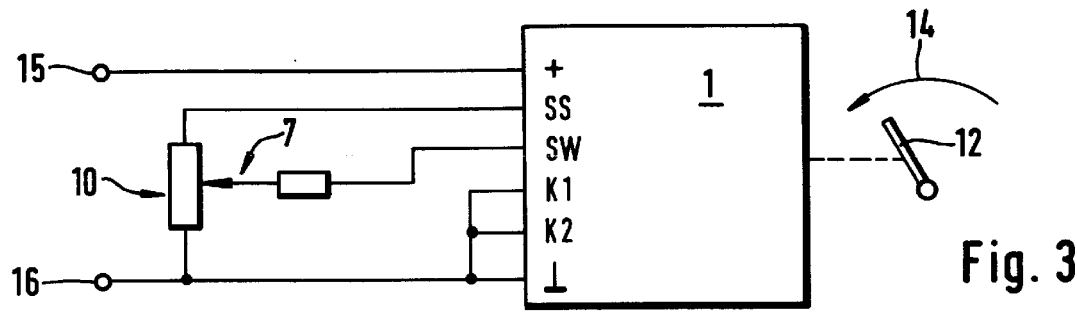

In the exemplary embodiment according to FIG. 3, the terminals SS/SW of the input lead 7 are connected to the voltage divider 10 according to FIG. 2. The encoding inputs K1 and K2 are both grounded (terminal 16), thus resulting in a direction of adjustment of the ventilation flap 12 out of the position of rest shown in FIG. 3 counterclockwise according to the arrow 14. The possible adjustment angle of the ventilation flap 12 out of the position of rest shown is approximately 100°.

Figure 4:
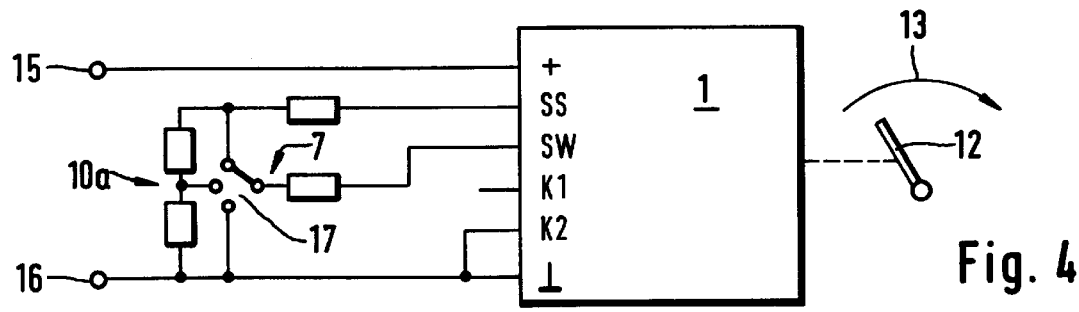

In the exemplary embodiment according to FIG. 4, a switchable voltage divider 10a is provided instead of a continuously adjustable voltage divider in FIGS. 2 and 3, with the result that different voltage potentials can be switched between the terminals SS/SW. In the exemplary embodiment shown, the switch 17 has three switch positions, by means of which the respective predetermined rotary angle positions of the stepping motor and therefore adjustment angle positions of the ventilation flap 12 adjusted by the stepping motor are possible. The encoding input K2 is grounded, whilst the encoding input K1 is open. This encoding results in a direction of rotation out of the position of rest shown clockwise according to the arrow 13, with a possible adjustment angle of the ventilation flap 12 of approximately 90°. The adjusting movement takes place between three positions which are predetermined by the switch 17 and which can be preset by the choice of the ohmic resistors of the voltage divider 10a.

Figure 5:
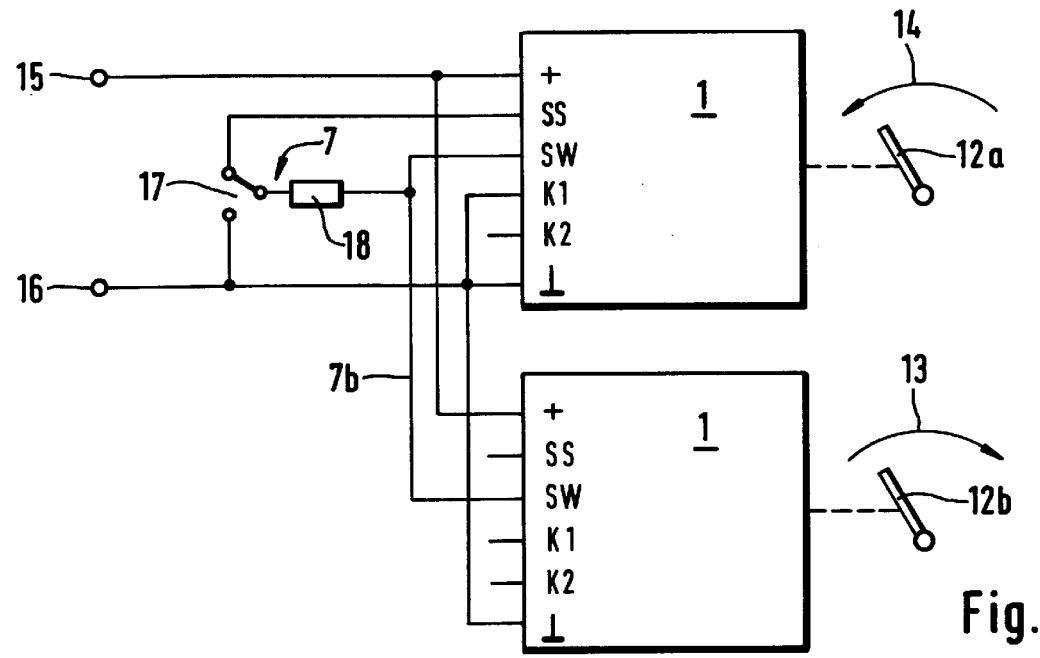

In the exemplary embodiment according to FIG. 5, the control branch 7b of the input lead 7 is switched to the inputs SW of two setting devices 1 located next to one another in parallel and is to be either grounded (terminal 16) or applied to the input SS of the setting device 1 via an ohmic resistor 18 and a switch 17. The encoding input K1 of the first setting device 1 is grounded, whilst its encoding input K2 as well as the encoding inputs K1 and K2 of the second setting device are open. This results, for the ventilation flap 12a activated by the first setting device, in a counterclockwise direction of rotation and, for the ventilation flap 12b actuated by the second setting device, in a clockwise setting movement (arrow 13). By means of the selected coding, the two ventilation flaps 12a and 12b can be adjusted out of their position of rest over an adjustment angle of 70°, the switch 17 determining either one end position of the ventilation flaps 12a and 12b or the other end position of the ventilation flaps 12a and 12b.

Figure 6:
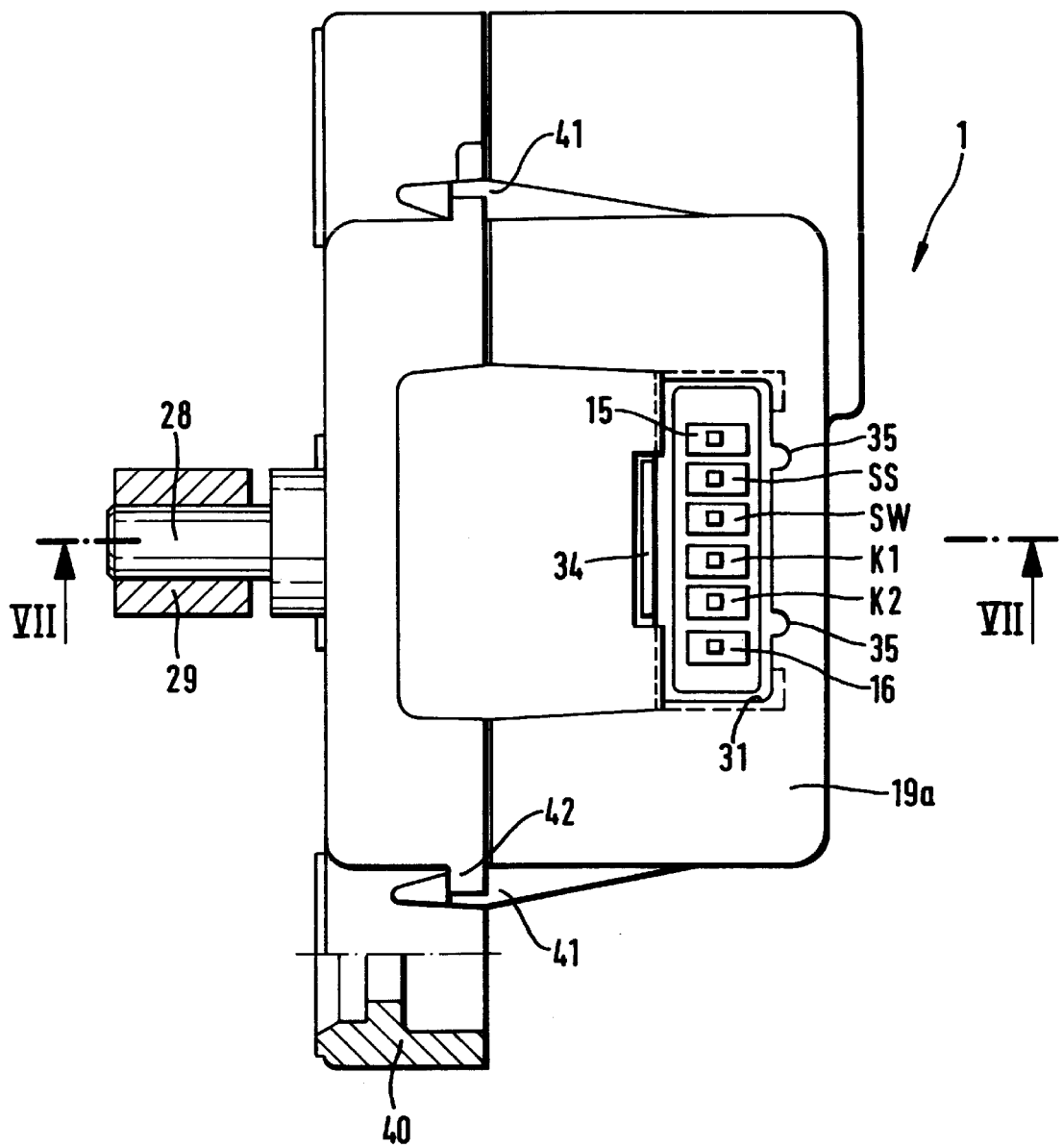
Figure 7:
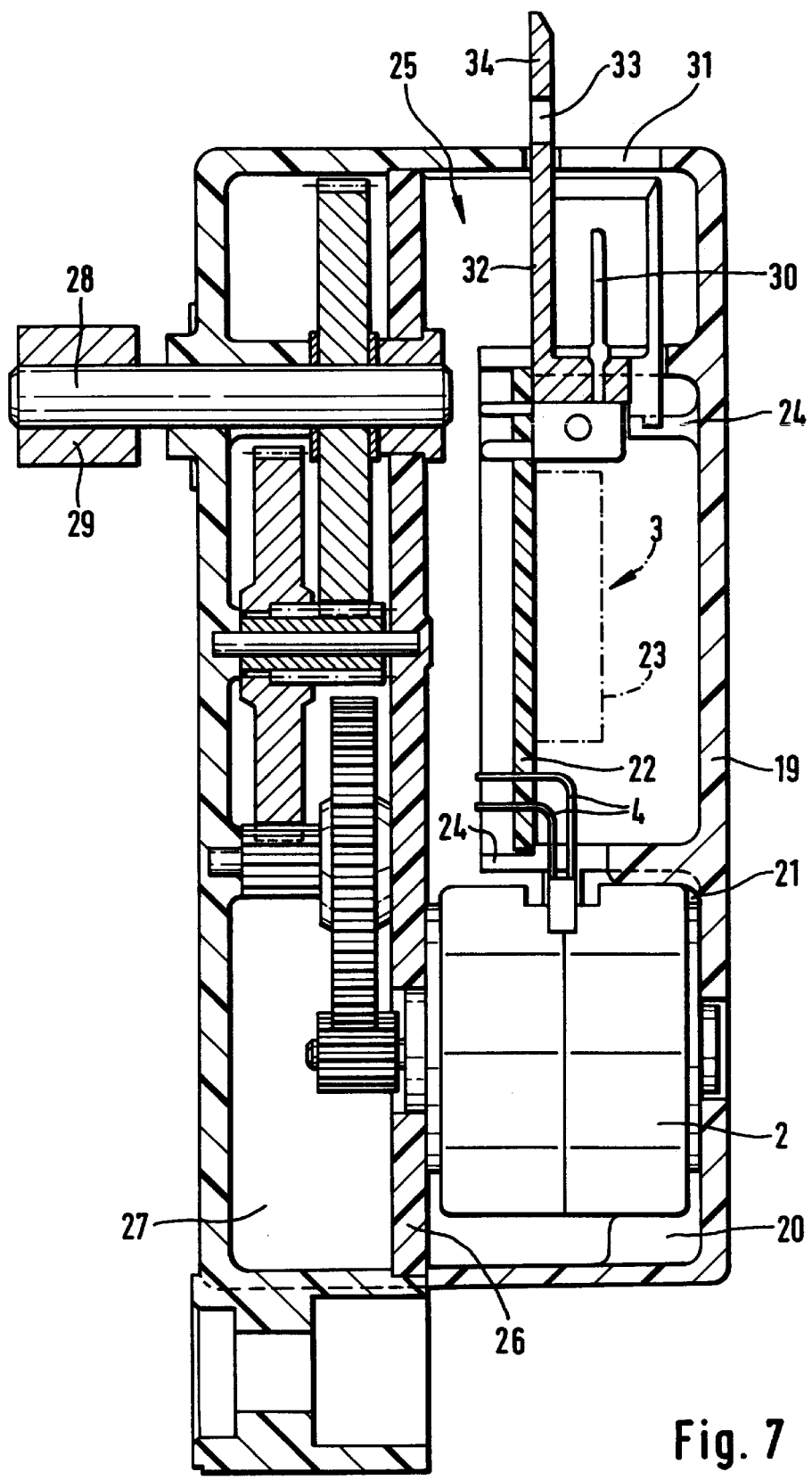
Figure 8:
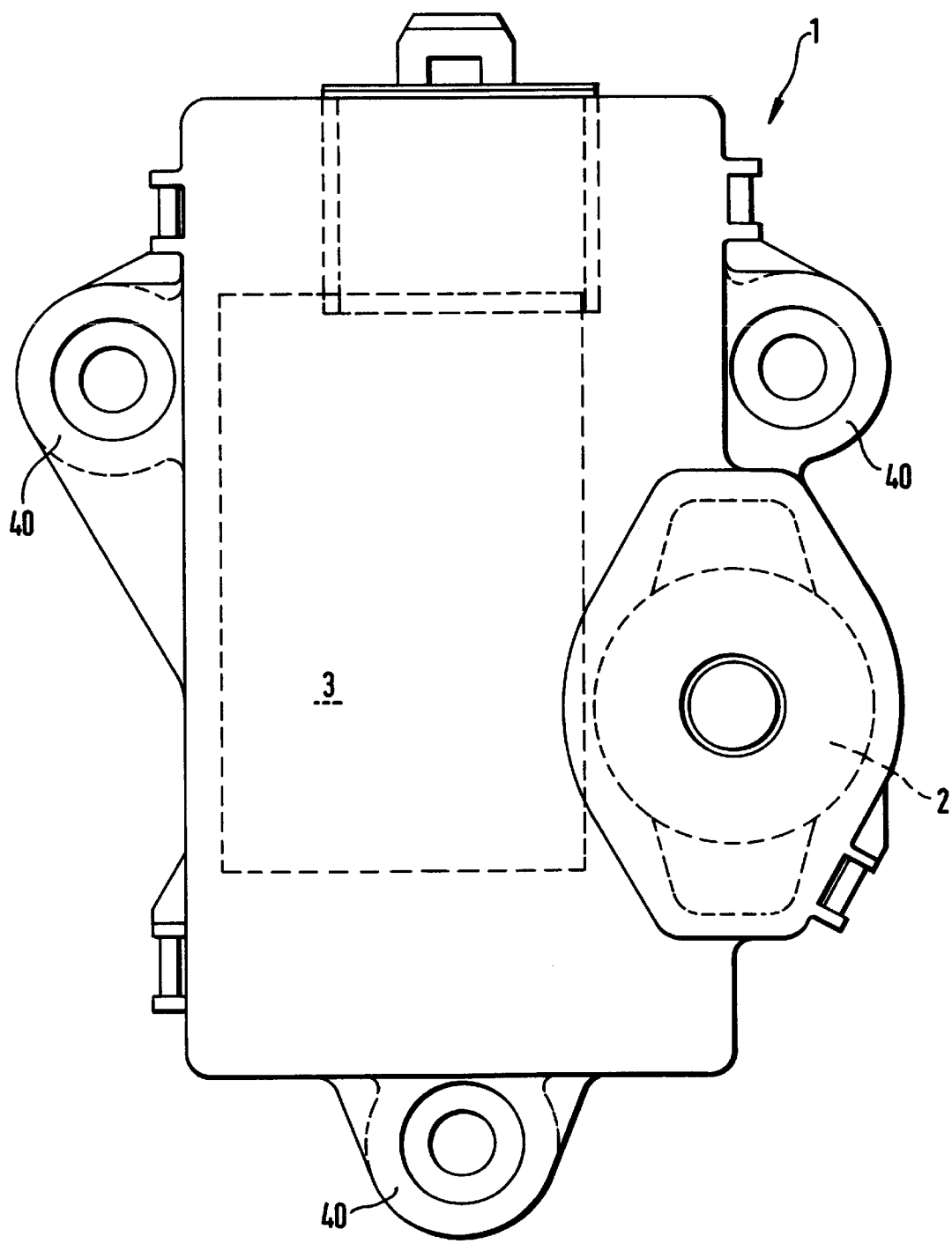

FIGS. 6 to 8 show a constructive setting device. As is evident particularly from the section in FIG. 7, the stepping motor 2 is held in bearings 20, 21 of a housing 19, the control leads 4 of the stepping motor 2 being soldered directly into a board 22 that carries the control unit 3. The control unit 3 can be designed as a discrete electronic circuit or be formed by a microprocessor 23. The control unit 3 arranged adjacent to the stepping motor 2 is held firmly in corresponding receptacles 24 of the housing 19. The stepping motor 2 and the control unit 3 are preferably located in a common receiving space 25 that is divided by a partition 26 from a gear space 27, into which the drive shaft of the stepping motor 2 projects. In the exemplary embodiment shown, the gear consists of mating gearwheels, via which the necessary adjusting force is applied. A stepdown or stepup that may be necessary can be provided. The output shaft 28 of the gear is connected, via a coupling 29 indicated, to the adjusting shaft of the ventilation flap 12, 12a or 12b.

The housing division plane is preferably level with the partition 26, so that, after the removal of a housing cover 19a (FIG. 6), access to the stepping motor 2 and to the control unit 3 is possible.

The junction terminals of the control unit (supply voltage, input leads, encoding inputs) are located preferably at that edge of the board 22 opposite the stepping motor 2 and are designed, in particular, as plug junctions 30. The plug junctions 30 are located opposite a window 31 in the housing 19, a safety member 32 fixed in the receiving space 25 projects through the window 31, and a locking orifice 33 is provided in the free end 34 of the safety member, the free end protruding out of the window 31. A plug which can be plugged through the window 31 onto the plug junctions 30 in order to make the electrical connections has a locking means engaging into the locking orifice 33, with the result that the plug is held captive on the plug junctions 30.

Provided in that edge of the window 31 opposite the safety element 32 are recesses 35, into which corresponding projections of the plug (not shown) engage. The recesses 35 guarantee that the plug is plugged onto the plug junctions 30 in the correct position, thereby at all events guaranteeing a proper electrical connection.

The setting device 1, to be installed ready for operation by plugging on the plug, has fastening lugs 40 on the housing part receiving the gear. Preferably, three fastening lugs 40 are injection-molded onto the housing made particularly from plastic, and consequently, even with the setting device mounted, access to the electric drive unit and to the control unit is possible after the release of the cover 19a. The cover 19a (FIG. 6) engages by locking means 41 over a correspondingly designed locking edge 42 of the lower housing part receiving the gear.

The same setting device 1 can be used in each case, irrespective of the place of use, the direction of rotation and the rotary angle of the stepping motor and consequently the direction of adjustment and the adjustment angle of the ventilation flap 12, 12a, 12b actuated by the stepping motor being determined by the connection of the encoding inputs K1, K2. In particular, a synchronous or asynchronous control of parallel ventilation flaps is possible in a simple way by means of the setting device according to the invention. A plurality of encoding inputs K1 and K2 can also be provided, in particular a bit switch or the like can be used. In the case of a 4-bit switch, 16 different positions can be encoded.

The diagnosis circuit 9 represented in FIG. 1 can, on the one hand, check the control unit 3 for electrical faults; on the other hand, there is the possibility that, via the diagnosis circuit 9, the control unit can automatically recognize which end position the instantaneous adjustment position of the ventilation flap is nearest. When the setting device is currentless, a return of the ventilation flap into the nearest end position takes place, so that, when operation resumes, the positions that the ventilation flaps occupy before being rendered inoperative are reached again in the shortest possible time.

We claim:

1. A setting device for a ventilation flap in an air duct in a heating and ventilation system of an automobile, comprising:
   a stepping motor having a rotatable output shaft adapted to move the ventilation flap, wherein pulses are used to control the rotary movement of the output shaft;
   a control unit situated adjacent to the stepping motor for controlling the stepping motor, wherein the control unit has encoding inputs for selecting both the direction of rotation and rotary angle of the output shaft.

2. A setting device according to claim 1, wherein the control unit receives an analog input.

3. A setting device according to claim 1, further including a common housing, the stepping motor and the control unit being arranged in the common housing.

4. A setting device according to claim 1, wherein the stepping motor has a housing and the control unit is arranged in the housing.

5. A setting device according to claim 3, wherein the common housing has a receiving space and a gear space separate from the receiving space, the gear space accommodating gears, wherein the output shaft of the stepping motor drives the ventilation flap via the gears, and the stepping motor and the control unit are arranged within the receiving space.

6. A setting device according to claim 3, wherein the control unit has a plug junction for receiving electrical connections.

7. A setting device according to claim 6, wherein the common housing has a window through which the plug junction extend.

8. A setting device according to claim 2, wherein the control unit has an ohmic voltage divider receiving an analog input signal.

9. A setting device according to claim 1, wherein the control unit is a microprocessor.

10. A setting device according to claim 1, wherein the control unit has a self-diagnosing circuit.

* * * * *

UNITED STATES PATENT AND TRADEMARK OFFICE
CERTIFICATE OF CORRECTION

PATENT NO. : 5,934,644
DATED : August 10, 1999
INVENTOR(S) : Pierre BOILLAT, et al.

It is certified that error appears in the above-identified patent and that said Letters Patent is hereby corrected as shown below:

On the title page, [73] Assignee, delete "Saia AG Industrie-Elektronik Und Komponenten Behr GmbH & Co. Stuttgart, Germany" and replace with --BEHR GmbH & Co., Stuttgart, Fed. Rep. of Germany and SAIA AG INDUSTRIE-ELEKTRONIK UND KOMPONENTEN, Murten, Switzerland--.

Signed and Sealed this

Eighth Day of August, 2000

Attest:

Q. TODD DICKINSON

*Attesting Officer*     *Director of Patents and Trademarks*